United States Patent Office 3,020,781
Patented Feb. 13, 1962

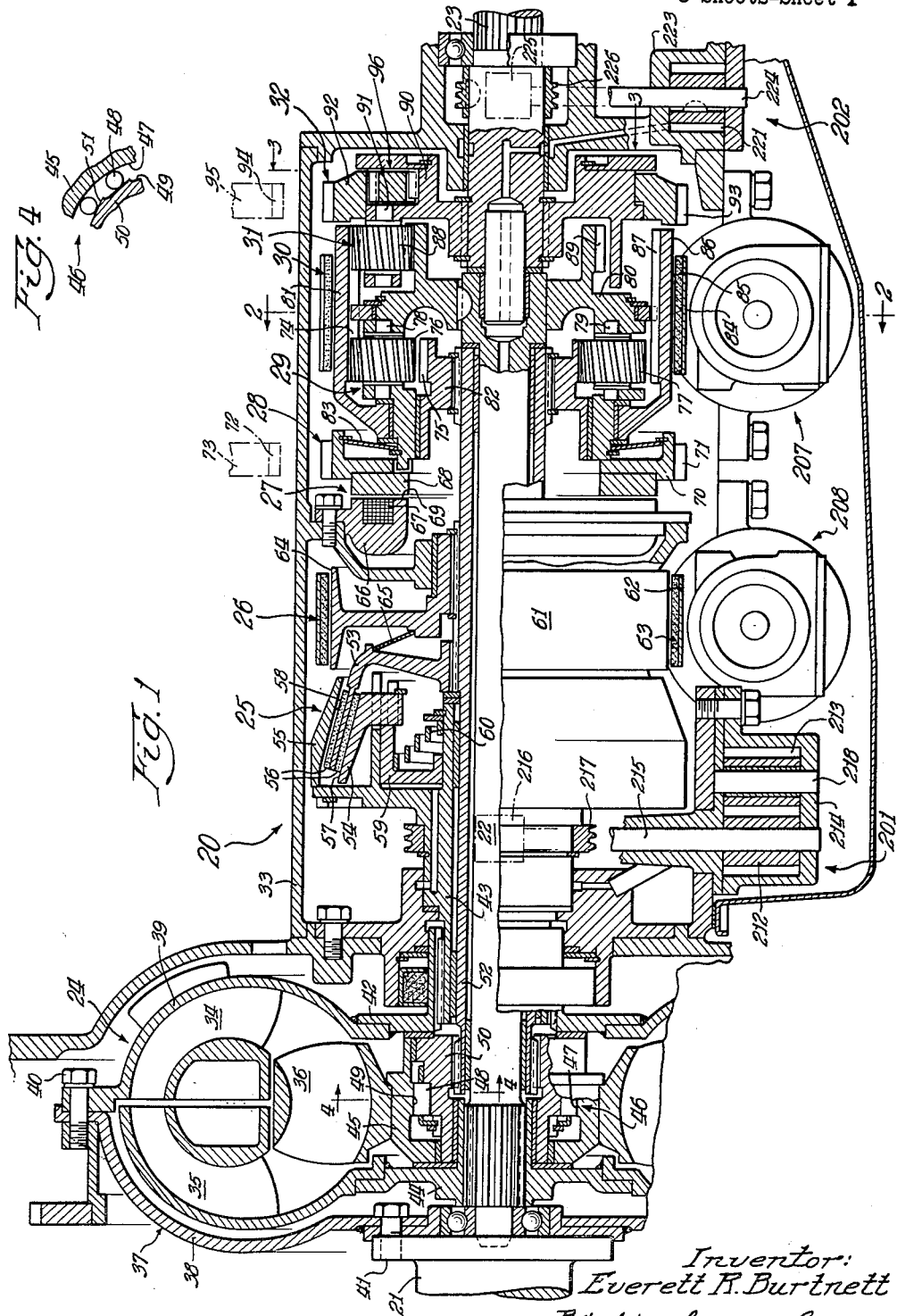

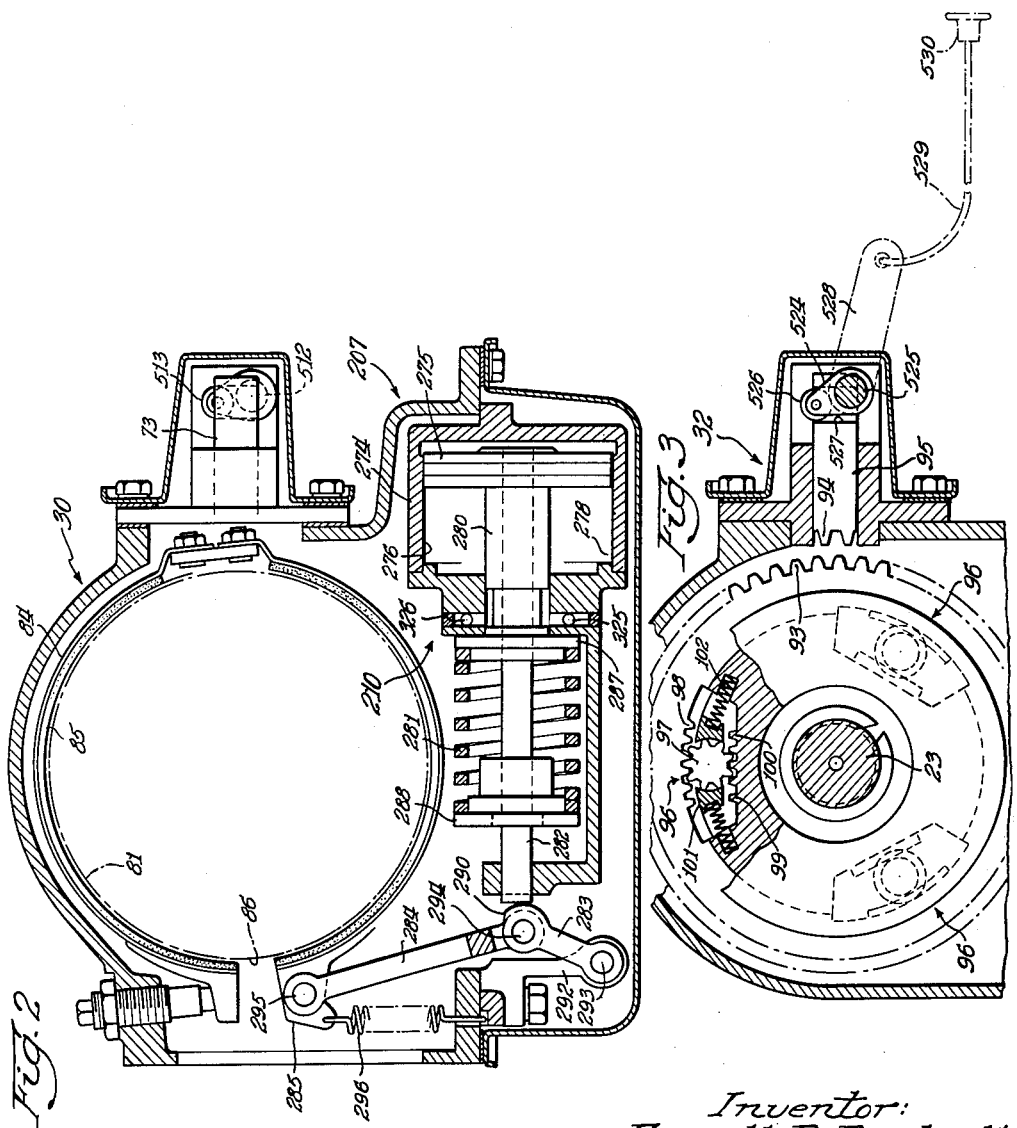

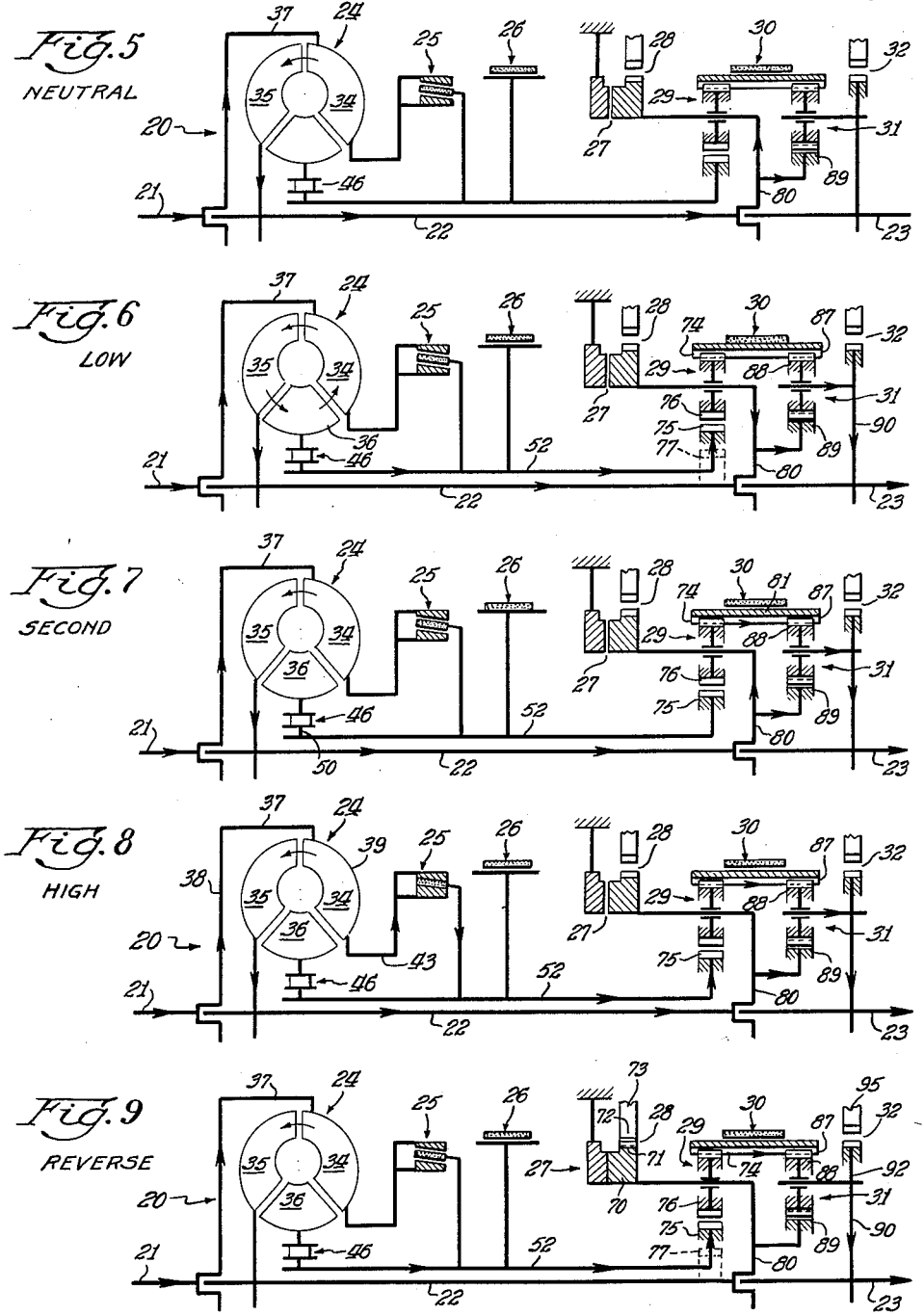

3,020,781
TRANSMISSION MECHANISM
Everett R. Burtnett, China Lake, Calif., assignor to Borg-Warner Corporation, Chicago, Ill., a corporation of Illinois
Filed Oct. 2, 1957, Ser. No. 687,824
7 Claims. (Cl. 74—688)

My invention relates to transmissions for automotive vehicles and particularly to transmissions of the hydraulic torque converter type.

It is an object of the present invention to provide an improved hydraulic torque converter type transmission having a low speed forward drive, a second speed forward drive, a high speed forward drive, and a reverse drive; the high speed forward drive being of the two path type with one path exclusive of the hydraulic torque converter for thereby obtaining a high efficiency in the transmission of power through the transmission.

It is an object of the present invention to utilize the combination of a hydraulic torque converter and planetary gearing whereby reverse driving torque applied against one element of the torque converter is effectively applied through the planetary gearing for the forward driving of the vehicle at low speeds, thereby obtaining greater starting torque and greater efficiency in low speed forward drive.

It is an additional object of the present invention to provide an improved hydraulic torque converter type transmission having a duplex planetary gear set and a simple planetary gear set connected together for providing a low speed forward drive, a second speed forward drive, a high speed forward drive, and a reverse drive through the transmission.

It is another object of the present invention to provide an improved transmission having the combination of a hydraulic torque converter, a duplex planetary gear set, and a simple planetary gear set, wherein reverse drive condition through the transmission is established by the reverse driving of an element of the hydraulic torque converter through the planetary gearing with a multiplication of torque by means of the planetary gearing.

This invention consists of the novel constructions, arrangements, and devices to be hereinafter described and claimed for carrying out the above stated objects and such other objects as will be apparent from the following description of a preferred form of the invention, illustrated with reference to the accompanying drawings, wherein:

FIG. 1 is a longitudinal sectional view of a transmission embodying the principles of the invention;

FIGS. 2 and 3 are sectional views taken on lines 2—2 and 3—3 respectively of FIG. 1;

FIG. 4 is a sectional view taken on line 4—4 of FIG. 1; and

FIGS. 5, 6, 7, 8 and 9 are, respectively, diagrams illustrating the transmission in neutral, low, second, high, and reverse drives.

Like characters of reference designate like parts in the several views.

Referring to the drawings, a transmission mechanism 20 embodying the principles of the invention is shown as it is used in an automotive vehicle. The transmission mechanism 20 includes a drive shaft 21, an intermediate shaft 22 and a driven shaft 23 all coaxially disposed. The drive shaft 21 is adapted to be connected to the crank shaft of the vehicle engine, and the driven shaft 23 is adapted to be connected to the driving road wheels of the vehicle through any suitable means (not shown).

The transmission mechanism 20 as a whole, comprises a hydraulic torque converter 24, a direct drive cone clutch 25, a brake 26, an electromagnetic brake 27, a reverse drive positive type brake 28, a front duplex planetary gear unit 29, a brake 30, a rear simple planetary gear unit 31, and a positive type parking brake 32, all enclosed within a casing 33.

The torque converter 24 is of conventional construction and comprises a bladed driving element or impeller 34, a bladed driven element or turbine 35, and a bladed stator 36, all enclosed within a fluid housing 37. The housing 37 has sections 38 and 39 which are fastened together by machine screws 40. The section 38 is fastened to the drive shaft 21 by machine screws 41, and the section 39 is welded to a hub 42 which is splined to a sleeve shaft 43 journalled within the casing 33. The impeller 34 is integral with the section 39. The turbine 35 is welded to a hub 44 which is splined to the intermediate shaft 22. The stator 36 is fastened to a hub 45 which forms an external part of a one-way engaging device 46. The one-way device 46 comprises an internal cylindrical surface 47 formed in the hub 45, a plurality of rollers 48 interposed between the surface 47 and an external surface 49 formed on a hub 50. The hub 50 has a cam 51 for each of the rollers 48 for wedging the rollers 48 against the surface 47. The hub 50 is splined to a sleeve shaft 52 which is journalled inside of the sleeve shaft 43. The intermediate shaft 22 is journalled inside of the concentric sleeve shafts 52 and 43.

The direct drive cone clutch 25 comprises a coned plate 53 splined for axial movement to the sleeve shaft 52, a movable inner clutch member 54 and an outer clutch member 55 formed integrally with the sleeve shaft 43. The clutch plate 53 has inner and outer friction facings 56. The inner facing 56 is adapted to engage an external conical surface 57 formed on the member 54, and the outer friction facing 56 is adapted to engage an internal conical surface 58 formed in the member 55. The member 54 is adapted to be moved axially by means of a fluid pressure actuated piston 59 for engaging the cone clutch 25. The cone clutch 25 is normally held in a disengaged condition by means of a spring 60 acting against the piston 59.

The brake 26 comprises a drum 61 splined to the sleeve shaft 52 and a brake band 62 having a friction facing 63 adapted to engage an external cylindrical surface 64 formed on the drum 61. A Belleville type washer 65 is interposed between the drum 61 and the clutch plate 53 of the front cone clutch 25. This washer 65 is effective to disengage the clutch plate 53 from the outer clutch member 55 when the clutch 25 is disengaged.

The electromagnetic brake 27 comprises a casing 66 anchored within the casing 33 and enclosing coil windings 67 and a plate member 68 adapted to be moved axially so as to frictionally engage a surface 69 formed on the casing 66.

The reverse drive positive brake 28 comprises an annular member 70 welded to the plate 68 and having external teeth 71 adapted to be engaged by teeth 72 formed on a radially movable pawl 73.

The duplex planetary gear unit 29 comprises a ring gear 74, a sun gear 75, a plurality of planet gears 76 in mesh with the ring gear 74 and a plurality of planet gears 77 in mesh with the sun gear 75. Each of the planet gears 76 is in mesh with a corresponding planet gear 77. The planet gears 76 are free to rotate about studs 78 and the planet gears 77 are free to rotate about studs 79. The studs 78 and 79 are mounted in a planet gear carrier 80 which is splined to the intermediate shaft 22. The ring gear 74 is formed in a drum 81 which comprises a part of the brake 30. The drum 81 is journalled on and supported by the planet carrier 80. The sun gear 75 is formed on a hub 82 which is splined to the sleeve shaft 52. A Belleville type washer 83 is interposed between the planet carrier 80 and the annular member 70 of the brake 28. This washer 83 is effective to maintain the plate 68 disengaged from the surface 69 when the coil windings 67 are de-energized.

The brake 30 comprises a band 84 having a friction facing 85 adapted to engage an external surface 86 formed on the drum 81.

The rear planetary gear unit 31 comprises a ring gear 87, a plurality of planet gears 88, a sun gear 89, and a planet carrier 90. The planet gears 88 are in mesh with the ring gear 87 and with the sun gear 89 and are free to rotate about studs 91 mounted in the planet carrier 90. The ring gear 87 is formed in the drum 81 of the brake 30. The sun gear 89 is formed on an extension of the planet carrier 80. The planet carrier 90 is splined to the driven shaft 23.

The positive type parking brake 32 (FIGS. 1 and 6) comprises an annular member 92 having external teeth 93 adapted to be engaged by teeth 94 formed on a radially movable pawl 95. The annular member 92 is connected to the planet carrier 90 through a plurality of wedging gear units 96. The gear units 96 each comprise a spur gear 97 interposed between internal teeth 98 formed in the member 92 and a transverse rack 99 having teeth 100 formed on the planet carrier 90. The spur gears 97 are held in position by brushes 101 and springs 102.

The transmission mechanism 20 may have a neutral condition and four driving conditions, namely, low speed forward drive, second speed forward drive, high speed forward drive, and reverse drive.

The operation of the transmission mechanism 20 in its various driving conditions may best be understood by references to FIGS. 5 to 9 inclusive.

The transmission mechanism 20 is in its neutral condition, as shown in FIG. 5, when the clutch 25 is disengaged, the brakes 26, 27, and 30, are disengaged, and the positive type brakes 28 and 32 are unlocked. In this condition, with the vehicle engine running, torque is transmitted through the drive shaft 21, the fluid housing 37, the impeller 34, the turbine 35, and the intermediate shaft 22 to the planet gear carrier 80 of the front planetary gear unit 29 and to the sun gear 89 of the rear planetary gear unit 31. There being no reaction element for either the planetary gear unit 29 or the planetary gear unit 31, the elements of these gear units rotate freely, and torque delivered by the vehicle engine is thus dissipated within the transmission mechanism 20.

Low speed forward drive is obtained, as shown in FIG. 6, when the brake 30 is engaged, the clutch 25 is disengaged, and the brakes 26, 27, 28, and 32 are disengaged. In this condition, torque delivered by the vehicle engine is transmitted through the drive shaft 21 and the fluid housing 37 to the impeller 34 of the torque converter 24. The rotation of the impeller 34 sets the fluid within the torque converter 24 in rotation in toroidal fashion, that is, the fluid set in motion by the impeller 34 is pumped into the turbine 35 impinging upon the face of the blades and tending to drive the turbine 35 forwardly; the fluid leaving the blades of the turbine 35 impinges upon the blades of the stator 36 tending to drive the stator 36 reversely. The curvature of the blades of the stator 36 is such that the direction of flow of fluid through the stator 36 is changed so that the fluid leaving the stator 36 enters the impeller 34 in the direction of rotation of the impeller 34. The forward driving torque delivered to the turbine 35 is transmitted through the intermediate shaft 22 to the carrier 80 of the gear unit 29 and to the sun gear 89 of the gear unit 31, driving these elements forwardly. The reverse driving torque imparted to the stator 36 is transmitted through the engaged one-way device 46 and the sleeve shaft 52 to the sun gear 75 of the front gear unit 29. The reverse rotation of the sun gear 75, that is, in the clockwise direction as viewed from the rear, causes the planet gears 77 to rotate forwardly or counterclockwise about the studs 79. The planet gears 77 drive the planet gears 76 reversely or clockwise about the studs 78 causing them to track around the interior of the ring gear 74 and carry the planet gear carrier 80 in the forward direction. The reverse driving torque delivered through the stator 36 is thus effective to drive the planet carrier 80 forwardly at reduced speed and increased torque. This forward driving torque combines with the forward driving torque delivered through the turbine 35 and the sleeve shaft 22 so as to drive the sun gear 89 of the rear gear unit 31. The forward rotation of the sun gear 89 causes the planet gears 88 of the planet carrier 90 to rotate forwardly with respect to the stationary ring gear 87 carrying the planet carrier 90 forwardly at reduced speed and increased torque. This torque is transmitted through the carrier 90 and the driven shaft 23 to the driving road wheels of the vehicle for initiating vehicle motion.

Second speed forward drive is obtained, as shown in FIG. 7, when the brake 26 is engaged, the clutch 25 is disengaged, and the brakes 27, 28, 30, and 32 are disengaged. In this condition, the brake 26 is effective to lock the sleeve shaft 52 against rotation, thereby holding stationary the sun gear 75 of the gear unit 29 and the inner hub 50 of the one-way unit 46. Torque delivered by the vehicle engine is transmitted through the drive shaft 21 and the fluid housing 37, and the impeller 34 to the turbine 35. The stator 36 is held stationary by the brake 26 through the engaged one-way device, and the hydrodynamic unit 24 functions as a torque multiplier in a conventional fashion. Torque imparted to the turbine 35 is transmitted through the intermediate shaft 22 to the planet carrier 80 and to the sun gear 89. The stationary sun gear 75 functions as a reaction element for the gear unit 29, and torque delivered to the planet carrier 80 is transmitted through the planet gears 76, the ring gear 74, the drum 81, and the ring gear 87 to the planet gears 88. Torque delivered through this last named path is combined in the planet gears 88 with torque delivered through the sun gear 89. This combined torque is transmitted through the planet carrier 90 to the driven shaft 23.

High speed forward drive is obtained, as shown in FIG. 8, when the clutch 25 is engaged, and the brakes 26, 27, 28, 30, and 32 are disengaged. In this condition, torque is transmitted from the vehicle engine through the drive shaft 21 and the section 38 of the fluid housing 37 to the section 39. The driving torque is split at the section 39 into two paths, one a fluid path and the other a mechanical path. Torque is transmitted through the fluid path which includes the impeller 34, the turbine 35, and the intermediate shaft 22 to the planet carrier 80 and to the sun gear 89 of the gear units 29 and 31, respectively. Torque is transmitted through the mechanical path which includes the section 39 of the fluid housing 37, the sleeve shaft 43, the engaged cone clutch 25, and the sleeve shaft 52 to the sun gear 75 of the front planetary gear unit 29. This high speed forward drive condition is obtained only after the vehicle has attained a substantial speed, for example, in excess of 20 m.p.h. In this condition, the moving fluid within the torque converter 24 impinges upon the rear faces of the blades of the stator 36 causing the one-way device 46 to disengage, and the torque converter 24 thereafter functions as a simple fluid coupling with the turbine 35 rotating substantially at the same angular velocity as the impeller 34. With the sun gear 75 and the planet carrier 80 both rotating forwardly at the same angular velocity, the front gear unit 29 will be substantially locked up so as to rotate as a unit except for slippage that occurs within the torque converter 24. When the front planetary 29 rotates as a unit, the ring gear 87 and the sun gear 89 of the rear planetary gear unit 31 must also rotate forwardly at the same speed and the gear unit 31 is therefore also locked up so as to rotate as a unit. High speed direct drive condition between the drive shaft 21 and the driven shaft 23 is thus established through the transmission mechanism 20 except for slippage that may occur within the fluid torque converter 24.

Reverse drive condition is obtained, as shown in FIG. 9, when the brakes 27 and 28 are engaged, and the clutch, 25, and the brakes 26, 30 and 32 are disengaged. The electromagnetic brake 27 is energized initially to arrest any idling motion of the planet carrier 80 and thus insure non-clash engagement of the teeth 72 on the pawl 73 with the external teeth 71 on the annular member 70. The brake 27 is de-energized as soon as the brake 28 is engaged. The engaged positive brake 28 is effective to hold stationary the planet carrier 80, the intermediate shaft 22, the turbine 35, and the sun gear 89 of the planetary gear set 31. With the turbine 35 stationary, the driving torque delivered through the drive shaft 21 and the impeller 34 is transmitted to the fluid within the torque converter 24. The moving fluid passes through the blades of the stationary impeller 35 and impinges against the blades of the stator 36, engaging the one-way device 46 and driving the stator 36 and the sleeve shaft 52 in the reverse direction. The reverse rotation of the sleeve shaft 52 and of the sun gear 75 splined to it causes the planet gears 77 to rotate in the forward or counterclockwise direction, viewed from the rear, about the studs 79. The stationary planet carrier 80 serves as a reaction element for the planetary gear set 29 and the planet gears 77 drive the planet gears 76 reversely about the studs 78 and this reverse rotation is imparted to the ring gear 74. The ring gear 87 of the planetary gear set 31 is thus driven reversely with the ring gear 74 and drives the planet gears 88 reversely around the stationary sun gear 89. The reverse driving of the planet gears 88 is transmitted through the planet carrier 90 to the driven shaft 23, thus completing the reverse drive power train through the transmission mechanism 20.

A parking brake is obtained by the engagement of the positive brake 32 when the vehicle and driven shaft 23 are at rest. The engaged positive brake 32 is effective to hold the annular member 92, the planet carrier 90, and the driven shaft 23 at rest through the wedging gear units 96. The gear units 96 provide an element of flexibility to ensure easy engagement and disengagement of the pawl 95 of the positive brake 32, notwithstanding a pre-existing torque acting on the driven shaft 23.

It is to be understood that my invention is not to be limited to the specific constructions and arrangements shown and described, except only insofar as the claims may be so limited as it will be understood to those skilled in the art that changes may be made without departing from the principles of the invention.

I claim:

1. In a transmission, the combination of a drive shaft; a driven shaft; a hydraulic torque converter having a driving member or impeller, a driven member or turbine, and a reaction element or stator; first and second planetary gear sets, each having drive, drive receiving, and driven elements, and said turbine being connected with a driving element of each of said gear sets, said driven element of said second gear set being connected to drive said driven shaft; a brake for said driven element of said first gear set and for said drive receiving element of said second gear set effective to complete a drive from said drive shaft through said torque converter and through both of said gear sets to said driven shaft, said stator being connected by a one-way engaging device with said drive receiving element of said first gear set for transmitting reverse driving torque to said drive receiving element of said first gear set to convert the reverse driving torque into forward driving torque by said first gear set to be combined with forward driving torque of said turbine for driving said driven shaft.

2. In a transmission, the combination of a drive shaft; a driven shaft; a hydraulic torque converter having a driving element or impeller, a driven element or turbine, and a reaction element or stator; a first duplex planetary gear set having a ring gear, a sun gear, a first set of planet gears in mesh with said ring gear and a second set of planet gears in mesh with said sun gear and with said first planet gears, and a planet gear carrier; a second simple planetary gear set having a ring gear, a sun gear, a plurality of planet gears in mesh with said ring and said sun gears, and a planet gear carrier; said turbine being connected with said first planet gear carrier and with said second sun gear, said first and second ring gears being rigidly interconnected and said second planet gear carrier being connected to drive said driven shaft; a one-way engaging device for connecting said stator with said first sun gear; and a brake for said ring gears effective to complete a low speed forward drive power train from said drive shaft through said hydraulic torque converter and through said gear sets to said driven shaft, reverse driving torque of said stator being transmitted through said one-way engaging device to said sun gear of said first gear set and being converted in said first gear set into forward driving torque, this forward driving torque being combined in said first planet gear carrier with forward driving torque of said turbine and this combined torque being transmitted through said second sun gear to said second planet gear carrier for thereby driving said driven shaft at low forward speed.

3. In a transmission, the combination of a drive shaft; a driven shaft; a hydraulic torque converter having a driving element or impeller, a driven element or turbine, and a reaction element or stator; a first duplex planetary gear set and a second simple planetary gear set each having driving, drive receiving, and driven elements, said stator being connected by a one-way engaging device with said drive receiving element of said first gear set and said turbine being connected with said driving element of each of said gear sets; and a brake for said stator and for said drive receiving element of said first gear set for taking reaction of said stator and said gear set, said driven element of said second gear set being connected to said driven shaft, said driven element of said first gear set being connected to said drive receiving element of said second gear set so that said brake is effective to complete a drive from said drive shaft through said torque converter and through said gear sets to said driven shaft.

4. In a transmission, the combination of a drive shaft; an intermediate shaft; and a driven shaft; a hydraulic torque converter having a driving element or impeller, a driven member or turbine, and a reaction element or stator; said impeller being driven by said drive shaft and said turbine being connected to drive said intermediate shaft; a first duplex planetary gear set having a ring gear, a sun gear, a first set of planet gears in mesh with said ring gear, a second set of planet gears in mesh with said first planet gears and with said sun gear, and a planet gear carrier; a second simple planetary gear set having a ring gear, a sun gear, a plurality of planet gears in mesh with said ring and sun gears, and a planet gear carrier, said stator being connected with said sun gear of said first planetary gear set, said intermediate shaft being connected with said first planet gear carrier and with said second sun gear, and said second planet gear carrier being connected to drive said driven shaft; a one-way engaging device for connecting said stator with said first sun gear; and a brake effective to hold said stator through said one-way engaging device and also to hold said first sun gear for thereby taking reaction of said first planetary gear set and completing an intermediate or second speed forward drive power train from said drive shaft through said hydraulic torque converter and through said planetary gear sets to said driven shaft.

5. In a transmission, the combination of a drive shaft; an intermediate shaft; a driven shaft; a hydrodynamic coupling device having a driving member or impeller, a driven member or turbine, and a reaction member or stator, said impeller being connected with said drive shaft and said turbine being connected to said intermediate shaft; first and second planetary gear sets each having drive, drive receiving, and driven elements, a drive receiving element of said first planetary gear set being connected with said stator to be driven thereby, said drive element of each of said planetary gear sets being connected with said intermediate shaft to be driven thereby, other elements of said planetary gear sets being interconnected, and said driven element of said second gear set being connected to said driven shaft for driving the same; a brake mechanism for said driven element of said first gear set and said drive receiving element of said second gear set for taking reaction of said gear sets and thereby completing a drive through said hydrodynamic device and said gear sets to said driven shaft, said stator being connected to an element of said first gear set by a one-way engaging device effective to drive reversing torque through said first planetary gear set for being converted by said first gear set to forward drive effectively applied to drive said driven shaft; and a friction engaging device effective to connect an element of said first gear set with said drive shaft for thereby completing a high speed two path drive between said shafts with one path being through said hydrodynamic device and the other path being exclusive of said hydrodynamic device.

6. In a transmission, the combination of a drive shaft; an intermediate shaft, a driven shaft; a hydraulic torque converter having a driving member or impeller, a driven member or turbine, and a reaction member or stator, said impeller being connected to said drive shaft to be driven thereby and said turbine being connected to said intermediate shaft for driving the same; a first duplex planetary gear set and a second simple planetary gear set, said first gear set comprising a ring gear, a sun gear, a first set of planet gears in mesh with said ring gear, a second set of planet gears in mesh with said first planet gears and with said sun gear, and a planet gear carrier; said second planetary gear set comprising a ring gear, a sun gear, a plurality of planet gears in mesh with said ring and sun gears, and a planet gear carrier, said first sun gear being connected to said stator to be driven thereby, said first planet gear carrier and said second sun gear being interconnected and connected to said intermediate shaft to be driven thereby, said ring gears being rigidly interconnected and said second planet gear carrier being connected to drive said driven shaft; a one-way engaging device effective to connect said stator with said first sun gear for one direction of rotation of said stator; and a brake mechanism effective to hold stationary said first planet gear carrier, said second sun gear, said intermediate shaft, and said turbine for thereby taking reaction for both of said gear sets and completing a reverse drive power train from said drive shaft through said hydraulic torque converter and said planetary gear sets to said driven shaft, reverse driving torque being imparted through said stator and through said one-way engaging device and said first sun gear for driving said ring gears reversely and driving said second planet gears and said second planet gear carrier reversely for reverse driving of said driven shaft.

7. In a transmission, the combination of a drive shaft; an intermediate shaft; a driven shaft; a hydraulic torque converter having a driving member or impeller, a driven member or turbine, and a reaction member or stator, said impeller being connected with said drive shaft and said turbine being connected with said intermediate shaft; a first duplex planetary gear set having a ring gear, a sun gear connected to said stator, a first set of planet gears in mesh with said ring gear and a second set of planet gears in mesh with said sun gear and with said first planet gears, and a planet gear carrier; a second simple planetary gear set having a ring gear, a sun gear, a plurality of planet gears in mesh with said ring and said sun gears, and a planet gear carrier; said duplex planetary gear carrier being connected with said intermediate shaft to be driven thereby and said simple planetary gear carrier being connected to said driven shaft, said sun gear of said simple planetary gear set being connected to said intermediate shaft; a brake for the sun gear of the duplex gear set for taking the reaction of the planetary gear system and for taking reaction of said stator and thereby completing a second speed forward drive through said torque converter and said planetary gear system between said shafts; and engaging means including a clutch connecting an element of said duplex planetary gear set with said drive shaft, thereby completing a high speed two-path forward drive power train between said shafts with one path being through said hydraulic torque converter and the other path being exclusive of said hydraulic torque converter.

References Cited in the file of this patent

UNITED STATES PATENTS

| | | |
|---|---|---|
| 2,324,713 | McFarland | July 20, 1943 |
| 2,679,169 | Duffield | May 25, 1954 |
| 2,693,711 | Kelbel et al. | Nov. 9, 1954 |
| 2,695,533 | Pollard | Nov. 30, 1954 |
| 2,697,363 | Sheppard | Dec. 21, 1954 |
| 2,737,828 | Seybold | Mar. 13, 1956 |
| 2,768,503 | Snyder | Oct. 30, 1956 |
| 2,770,326 | Wayman | Nov. 13, 1956 |
| 2,814,361 | Schmidt | Nov. 26, 1957 |